June 10, 1941.  E. E. JELLISON  2,245,278
LUBRICATION INDICATOR
Filed Aug. 19, 1938
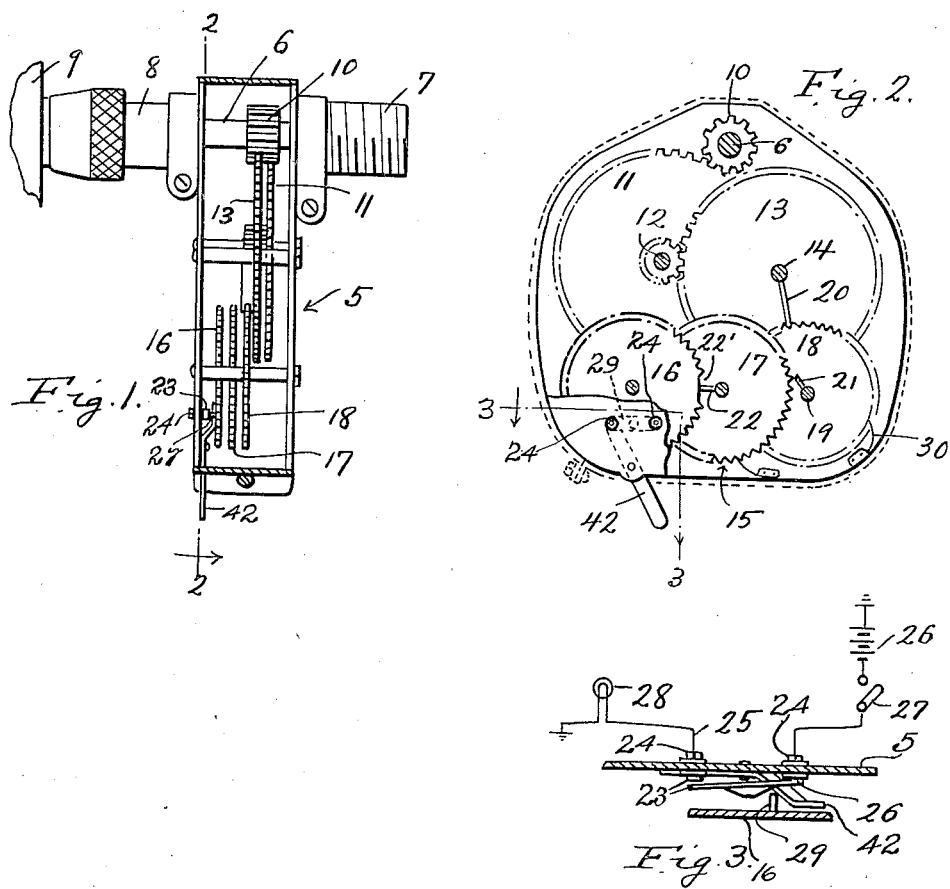
Inventor
*Ernest Edwin Jellison*
By *Clarence A. O'Brien*
*Hyman Berman*
Attorneys Patented June 10, 1941

2,245,278

UNITED STATES PATENT OFFICE 2,245,278

LUBRICATION INDICATOR

Ernest E. Jellison, Twin Falls, Idaho

Application August 19, 1938, Serial No. 225,793

1 Claim. (Cl. 200—52)

This invention relates to lubrication indicators especially adapted for motor vehicles, and has for the primary object the provision of a device of this character which may be readily installed on a motor vehicle for automatically indicating by a signal when the vehicle should be lubricated in accordance with the number of miles the vehicle has traveled.

Another object of this invention is the provision of means which may be readily set for operating the signal at different numbers of miles so that the signal may be made to operate when the vehicle has traveled different numbers of miles.

With these and other objects in view, the invention consists in certain novel features of construction, combination and arrangement of parts to be hereinafter more fully described and claimed.

For a complete understanding of my invention, reference is to be had to the following description and accompanying drawing, in which—

Figure 1 is a transverse sectional view showing the operating mechanism of the present invention as connected with the usual drive cable of a speedometer.

Figure 2 is a sectional view taken on line 2—2 of Figure 1.

Figure 3 is a detail sectional view taken on line 3—3 of Figure 2.

Referring in detail to the drawing, the numeral 5 indicates a gear casing in which is journaled a main shaft 6 equipped at one end and arranged exteriorly of the casing with a coupling 7 for connecting the shaft 6 onto a conventional type of speedometer shaft. The opposite end of the shaft 6 is equipped with a coupling 8 arranged exteriorly of the casing for connection with a speedometer, a portion of which is indicated by the character 9. This construction permits the present invention to be readily coupled into a speedometer arrangement now found on motor vehicles. The shaft 6 has secured thereon a gear 10 meshing with a gear 11 secured on a shaft 12 which is journaled in the casing 5. A gear of a smaller size than the gear 11 is secured on the shaft 12 and meshes with a gear 12 secured on a shaft 14 journaled in the casing. A train of gears, indicated by the character 15, is journaled in the casing 5 and includes gears 16, 17 and 18, all of which are secured on shafts indicated by the character 19. The shafts 19 are journaled in the casing 5. A finger 20 is secured on the shaft 14 to move into and out of engagement with the teeth of the gear 18 on each revolution of the gear 13 so that the gear 18 will be advanced one tooth during each revolution of the gear 13. The shaft 19 is provided with a finger 21 to move into and out of engagement with the teeth of the gear 17 during each revolution of the gear 18 so that the gear 17 will be advanced one tooth on each complete revolution of the gear 18. The shaft of the gear 17 has a finger 22 to move into and out of engagement with teeth on the gear 16 for advancing said gear 16 one tooth on each revolution of the gear 17. For example, when the gear 16 has made one complete revolution the motor vehicle to which the device is applied has traveled one thousand miles. The gear 16 has a space on its periphery, as indicated by the character 22′. This space is made by omitting a tooth so that when the finger 22 moves into the space 22′ the gear 16 becomes inoperative or idle.

Arranged on the interior of the casing 5 are spaced contacts 23 normally separated from each other and the terminals thereof, indicated by the character 24, are connected in an electric circuit 25 composed of a battery 26, a switch 27 and an electric lamp 28. One side of the circuit is in the form of a ground, as clearly shown in Figure 3. A pin 29 is carried by the gear 16 so that when said gear has made one complete revolution and come to rest by the finger 22 occupying a position in the space 22′, the pin 29 forces one of the contacts into engagement with the other contact and completes the electric circuit, thereby illuminating the electric lamp 28 which acts as a signal to indicate that the automobile has traveled one thousand miles and is in need of lubrication.

To prevent reverse rotation of the gears 17 and 18 spring dogs 30 engage therewith and are mounted on the casing 5.

When the gear 16 assumes a position to illuminate the electric lamp 28, the latter remains illuminated until the gear 16 is reset manually, that is, the gear 16 must be moved a limited distance so as to position the space 22′ out of the path of the arm or finger 22. After the gear 16 has been reset the finger 22 after completing one revolution with the shaft will engage the first tooth at one side of the space 22′ to advance the gear 16 one tooth which operation continues until the gear 16 has again made a complete revolution which is one thousand miles traveled by the automobile. In order to reset the gear 16 a spring influenced lever 42 is pivotally mounted in the casing 5 with its handle portion arranged exteriorly of the casing. When the lever is moved in one direction and against the action of the spring the inner end thereof will engage the pin 29 and move the gear 16 for the purpose of imparting sufficient movement to the gear 16 to bring the space 22' away from the position occupied by the finger 22, as shown in Figure 2.

What is claimed is:

In a device of the class described, a casing, a train of gears journaled therein, one gear having a smooth portion between two of its teeth, a finger on an adjacent gear for rotating said one gear until the finger enters the smooth space when further rotation of said one gear will cease, a pin on said one gear, a switch closed by the pin when the finger is in the smooth part of said one gear, a lever pivoted to a part of the casing and having one end extending therefrom, the other end of the lever engaging the pin for moving said one gear to a position where the finger will engage a tooth of said one gear to start rotation of said one gear again, said movement of the one gear by the lever moving the pin out of engagement with the switch and means for rotating that gear of the train which is farthest from the said one gear.

ERNEST E. JELLISON.